(12) United States Patent
Piens

(10) Patent No.: US 12,533,908 B2
(45) Date of Patent: Jan. 27, 2026

(54) WORK VEHICLE WITH MOUNTING SYSTEM FOR DIFFERENTLY SIZED WHEELS

(71) Applicant: CNH Industrial Belgium N.V., Zedelgem (BE)

(72) Inventor: Patrick Piens, Destelbergen (BE)

(73) Assignee: CNH Industrial Belgium N.V. (BE)

( * ) Notice: Subject to any disclaimer, the term of this patent is extended or adjusted under 35 U.S.C. 154(b) by 0 days.

(21) Appl. No.: 18/932,679

(22) Filed: Oct. 31, 2024

(65) Prior Publication Data
US 2025/0144960 A1  May 8, 2025

(30) Foreign Application Priority Data

Nov. 6, 2023  (EP) .................................... 23207826

(51) Int. Cl.
*B60B 35/14* (2006.01)
*A01D 69/00* (2006.01)

(52) U.S. Cl.
CPC .............. *B60B 35/14* (2013.01); *A01D 69/00* (2013.01); *B60B 2900/351* (2013.01)

(58) Field of Classification Search
CPC ........ B60B 2900/351; B60B 2900/521; B60B 35/12; B60B 35/14; B62D 49/06; B62D 49/0678; A01D 69/00
See application file for complete search history.

(56) References Cited

U.S. PATENT DOCUMENTS

| | | | | |
|---|---|---|---|---|
| 3,820,851 A * | 6/1974 | Longo | ....................... | B60B 3/14 411/398 |
| 3,834,766 A * | 9/1974 | Thousand | ................. | B60B 3/14 301/35.54 |
| 5,197,785 A * | 3/1993 | Berry | ........................ | B60B 3/16 301/9.1 |
| 5,785,391 A * | 7/1998 | Parry | ........................ | B60B 3/16 301/35.631 |
| 6,626,502 B1 * | 9/2003 | Petrak | ....................... | B60B 3/16 301/9.1 |
| 7,963,361 B2 | 6/2011 | Coers et al. | | |

(Continued)

FOREIGN PATENT DOCUMENTS

EP  3354925 B1  1/2020

OTHER PUBLICATIONS

Search Report mailed on May 10, 2024 by the European Patent Office for Application No. 23207826.1. (4 pages).

*Primary Examiner* — Laura Freedman
(74) *Attorney, Agent, or Firm* — Buchanan Ingersoll & Rooney PC

(57) ABSTRACT

A mounting system for a work vehicle includes: an axle; a final drive coupled to the axle and configured to rotate a wheel mounted to the final drive; and a pivot plate coupling the final drive to the axle. The pivot plate includes a first arrangement of plate mounting features and a second arrangement of plate mounting features that differs from the first arrangement of plate mounting features, the final drive including at least one set of drive mounting features and being rotatable from a first orientation where the at least one set of drive mounting features is aligned with the first arrangement of plate mounting features to a second orientation where the at least one set of drive mounting features is aligned with the second arrangement of plate mounting features.

19 Claims, 7 Drawing Sheets

(56) References Cited

U.S. PATENT DOCUMENTS

| | | | | |
|---|---|---|---|---|
| 9,156,312 | B1* | 10/2015 | Ruggeri | B60B 35/122 |
| 9,724,966 | B2* | 8/2017 | Daffue | B60B 35/109 |
| 10,495,164 | B2* | 12/2019 | Kurihara | B60T 13/665 |
| 11,760,125 | B2* | 9/2023 | Peterson | B60B 3/16 |
| | | | | 301/111.04 |
| 2012/0256474 | A1* | 10/2012 | Gorle | B60B 37/00 |
| | | | | 301/105.1 |
| 2020/0236852 | A1 | 7/2020 | Addifetti | |

* cited by examiner

WORK VEHICLE WITH MOUNTING SYSTEM FOR DIFFERENTLY SIZED WHEELS

CROSS REFERENCE TO RELATED APPLICATION

This application claims priority to European Patent Application Serial No: 23207826.1, filed Nov. 6, 2023, the content of such application being incorporated by reference herein in its entirety.

FIELD OF THE INVENTION

The present invention pertains to a work vehicle and, more specifically, to an agricultural vehicle that includes wheels.

BACKGROUND OF THE INVENTION

Many types of work vehicles, such as agricultural harvesters, are known. An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Many agricultural work vehicles are propelled on wheels. The wheels thus dictate the traction characteristics of the work vehicle as it travels, e.g., across a field or other site. In some instances, it may be optimal to change wheels for varying conditions in the field. For example, it may be optimal to mount differently sized wheels in order to reduce pressure that is exerted on the field by the vehicle. However, changing the wheels can be a difficult and time-consuming process. Further, the user may need to store different adapters in order to mount differently sized wheels.

What is needed in the art is a way to mount different wheels on a work vehicle that is more convenient than known ways.

SUMMARY OF THE INVENTION

Exemplary embodiments provided according to the present disclosure provide a mounting system with a pivot plate that has different arrangements of plate mounting features for coupling a final drive thereto in different orientations.

In some embodiments provided according to the present disclosure, a mounting system for a work vehicle includes: an axle; a final drive coupled to the axle and configured to rotate a wheel mounted to the final drive; and a pivot plate coupling the final drive to the axle. The pivot plate includes a first arrangement of plate mounting features and a second arrangement of plate mounting features that differs from the first arrangement of plate mounting features. The final drive includes at least one set of drive mounting features and is rotatable from a first orientation where the at least one set of drive mounting features is aligned with the first arrangement of plate mounting features to a second orientation where the at least one set of drive mounting features is aligned with the second arrangement of plate mounting features.

In some embodiments, the first arrangement of plate mounting features and/or the second arrangement of plate mounting features and/or the at least one set of drive mounting features comprises a plurality of mounting openings, preferably at least the first arrangement of plate mounting features and the second arrangement of plate mounting features each comprising a plurality of mounting openings, more preferably all of the first arrangement of plate mounting features, the second arrangement of plate mounting features, and the at least one set of drive mounting features each comprising a plurality of mounting openings.

In some embodiments, the mounting system includes an actuator coupled to the axle and configured to adjust a height of the axle.

In some embodiments, the pivot plate includes a shaft opening that is sized to allow an input shaft to extend therethrough and couple to the final drive when the final drive is in the first orientation and the second orientation.

In some embodiments provided according to the present disclosure, a driveline for a work vehicle includes previously described the mounting system and an input shaft coupled to the final drive and configured to drive the final drive and rotate a wheel mounted thereto.

In some embodiments, the input shaft extends through the shaft opening formed in the pivot plate. The input shaft may be configured to couple with the final drive in both the first orientation and the second orientation while the input shaft is in a set position.

In some embodiments, the shaft opening defines an opening diameter that is greater than a shaft diameter of the input shaft, preferably at least two times greater than the shaft diameter, more preferably at least three times greater than the shaft diameter.

In some embodiments, the final drive is configured to rotate about the input shaft from the first orientation to the second orientation.

In some embodiments, the driveline includes an actuator coupled to the axle and configured to adjust a height of the axle. The actuator may be configured to adjust the height of the axle without adjusting the height of the input shaft.

In some embodiments provided according to the present disclosure, a work vehicle includes a chassis, the previously described driveline carried by the chassis, and a wheel mounted to the final drive of the driveline.

In some embodiments, the wheel defines a first diameter when the final drive is in the first orientation or defines a second diameter that differs from the first diameter when the final drive is in the second orientation.

In some embodiments provided according to the present disclosure, a method of mounting wheels to the previously described driveline and/or to the previously described work vehicle is provided. The method includes: coupling the at least one set of drive mounting features to the first arrangement of plate mounting features while the final drive is in the first orientation; mounting a first wheel to the final drive, the first wheel defining a first diameter; dismounting the first wheel from the final drive; uncoupling the at least one set of drive mounting features from the first arrangement of plate mounting features; rotating the final drive to the second orientation; coupling the at least one set of drive mounting features to the second arrangement of plate mounting features while the final drive is in the second orientation; and mounting a second wheel to the final drive, the second wheel defining a second diameter that differs from the first diameter.

In some embodiments, a vertical level of the work vehicle is the same when the first wheel is mounted to the final drive and when the second wheel is mounted to the final drive.

One possible advantage that may be realized by embodiments provided according to the present disclosure is differently sized wheels can be mounted to the final drive by rotating and coupling the final drive to the pivot plate in different orientations.

Another possible advantage that may be realized by embodiments provided according to the present disclosure is the level of the work vehicle can be kept constant when differently sized wheels are mounted to the final drive.

Yet another possible advantage that may be realized by embodiments provided according to the present disclosure is a user does not need to store or utilize additional hardware to mount different wheels to the final drive.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
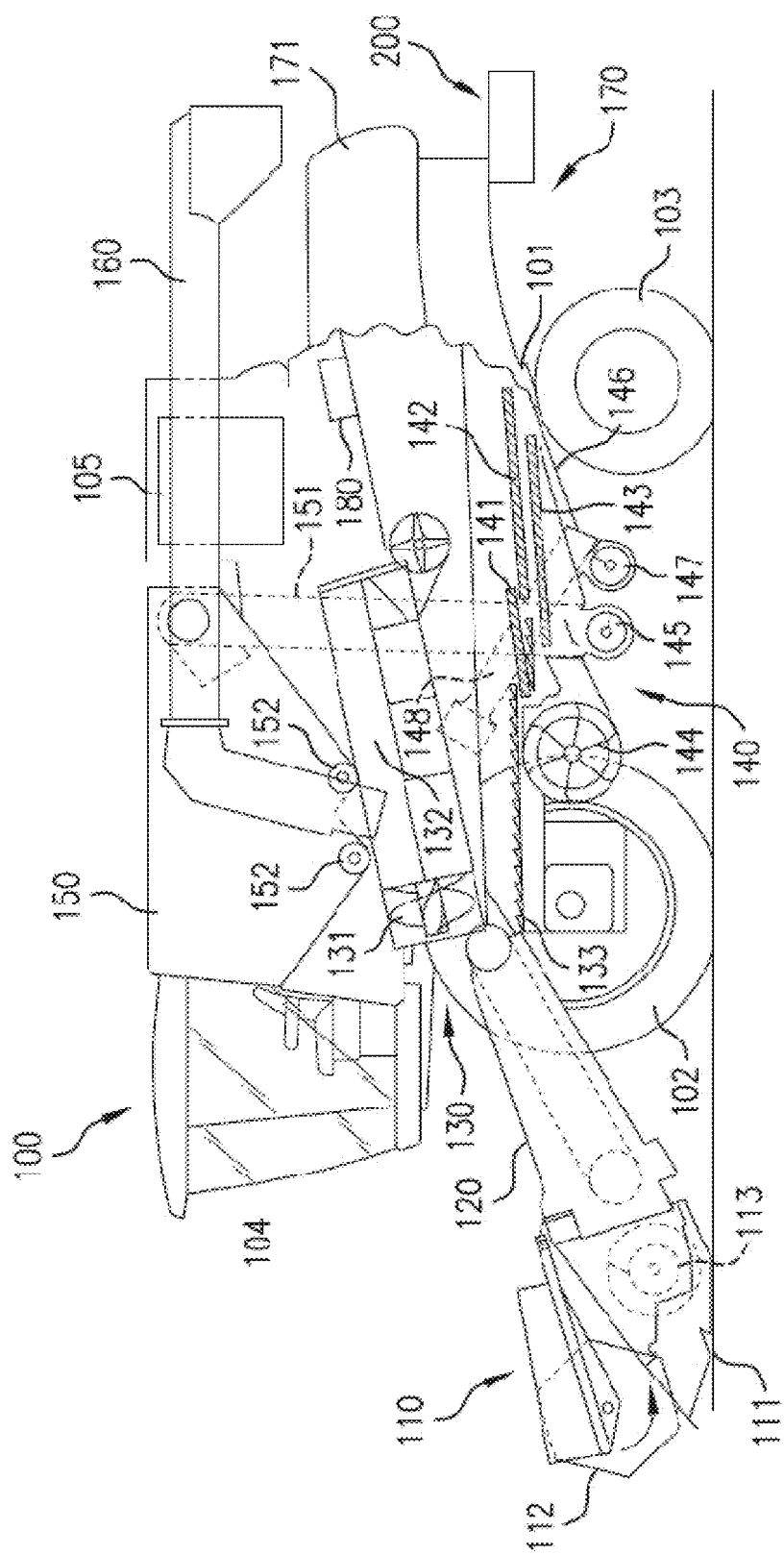
FIG. 1 illustrates a side view of an exemplary embodiment of an agricultural vehicle, the agricultural vehicle comprising a driveline including a mounting system that is provided in accordance with an exemplary embodiment of the present disclosure.
Figure 2:
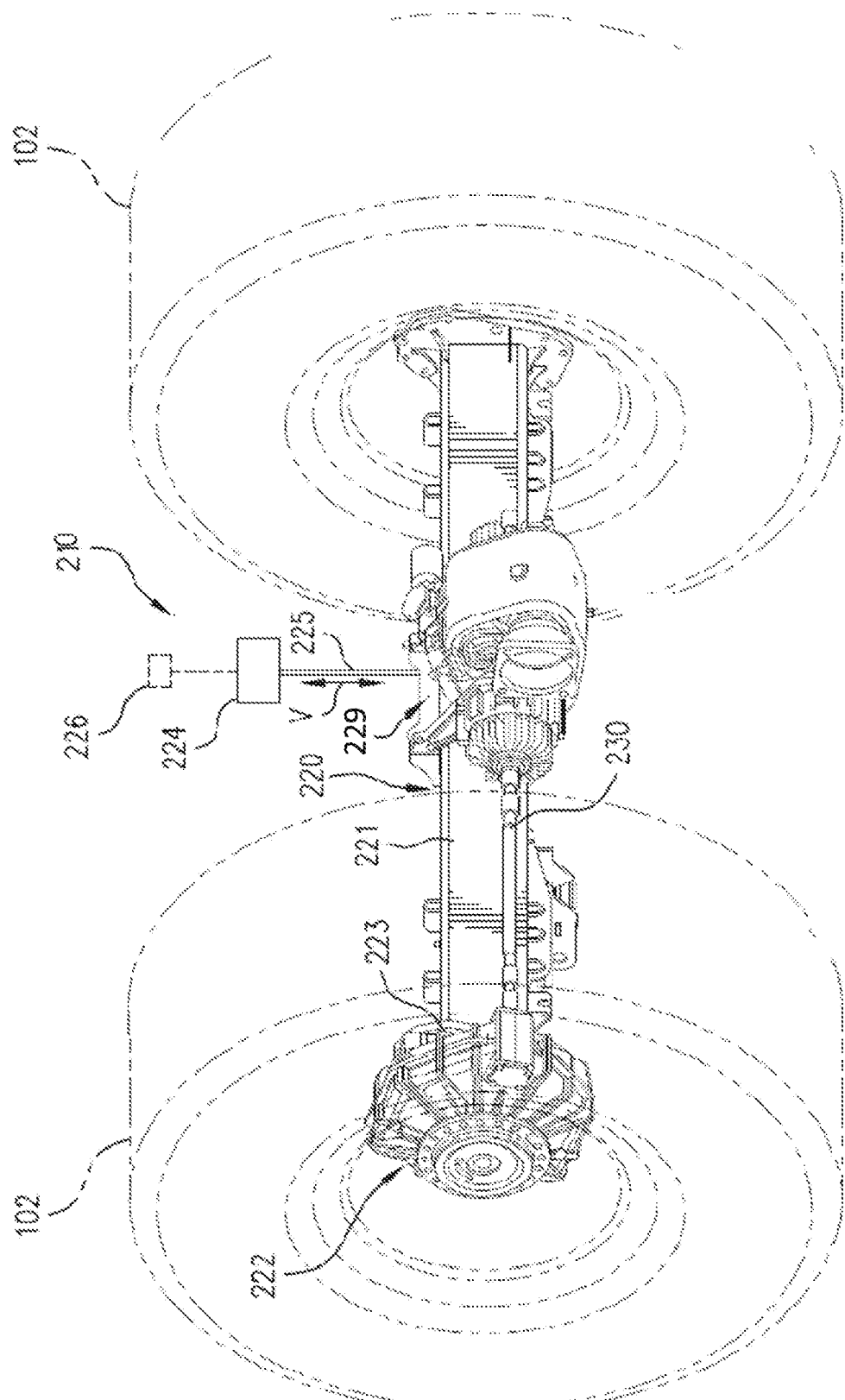
FIG. 2 illustrates a perspective view of the driveline including the mounting system of the work vehicle of FIG. 1, in accordance with an exemplary embodiment of the present disclosure.

Referring now to the drawings, and more particularly to FIG. 1, there is shown an embodiment of a work vehicle, which is illustrated as an agricultural harvester 100 in the form of a combine which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a driveline 210, which is illustrated in FIG. 2. Although the work vehicle 100 is illustrated as a combine harvester, it should be appreciated that the work vehicle 100 can be a different work vehicle, which may or may not be agricultural in nature.

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder housing 120. Feeder housing 120 conveys the cut crop to threshing and separating system 130, and is selectively vertically movable using appropriate actuators, such as hydraulic cylinders (not shown).

Threshing and separating system 130 is of the axial-flow type, and generally includes a threshing rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue management system 170 of combine 100. Optionally, the chaff and/or straw can proceed through a chopper 180 to be further processed into even smaller particles before discharge out of the combine 100 by a spreader assembly 200. It should be appreciated that the "chopper" 180 referenced herein, which may include knives, may also be what is typically referred to as a "beater", which may include flails, or other construction and that the term "chopper" as used herein refers to any construction which can reduce the particle size of entering crop material by various actions including chopping, flailing, etc. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

While the work vehicle 100 is illustrated with front wheels 102, it may be desired to change out the wheels 102 to a differently sized wheel. In known vehicles, this may be done by dismounting the wheel and installing an adapter before mounting a new, differently sized wheel. While such a procedure is effective, there are several disadvantages with such a procedure. Initially, this procedure requires storage of the adapter and associated parts, e.g., fasteners, which takes up space and may also frustrate a user if the correct adapter and/or parts are not on hand. Further, changing the size of the wheel may also result in the level of the vehicle changing, which can require the user to change other unrelated settings in order to optimize function of the vehicle. Thus, changing the wheels, especially to ones with a different size, can require substantial time and effort.

Figure 3:
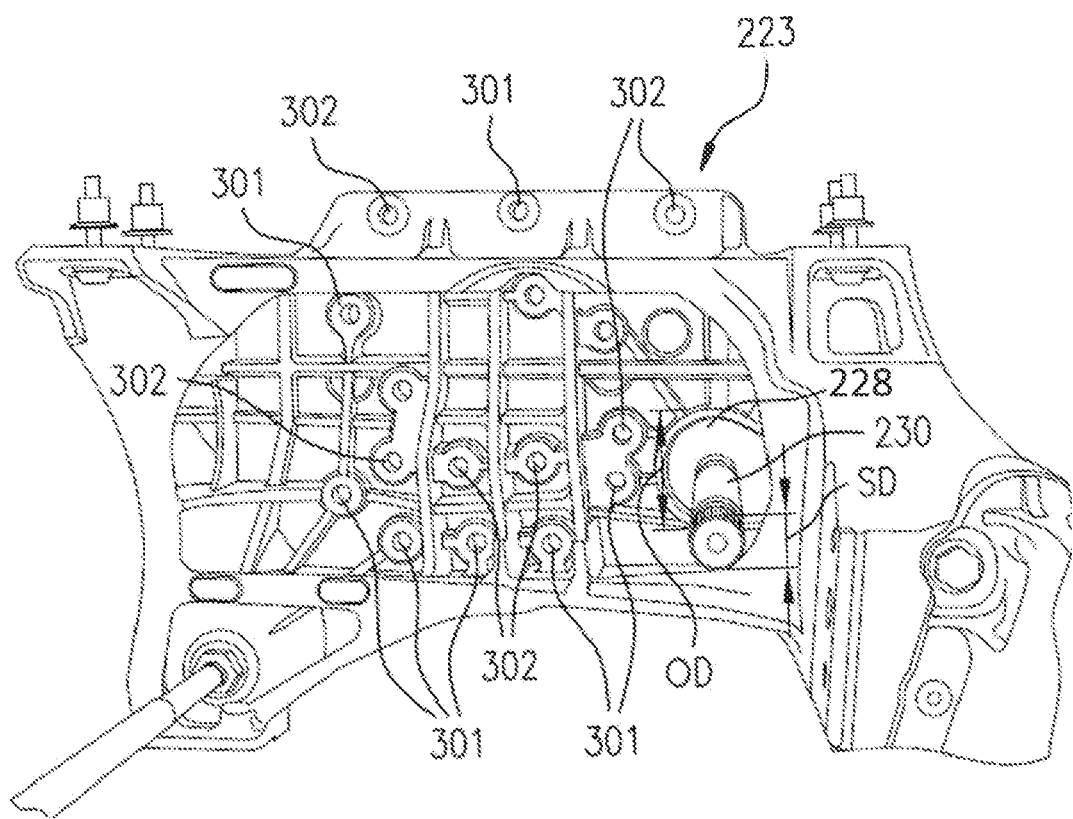
FIG. 3 illustrates an exemplary embodiment of a pivot plate and an input shaft of the driveline of FIG. 2.
Figure 4A:
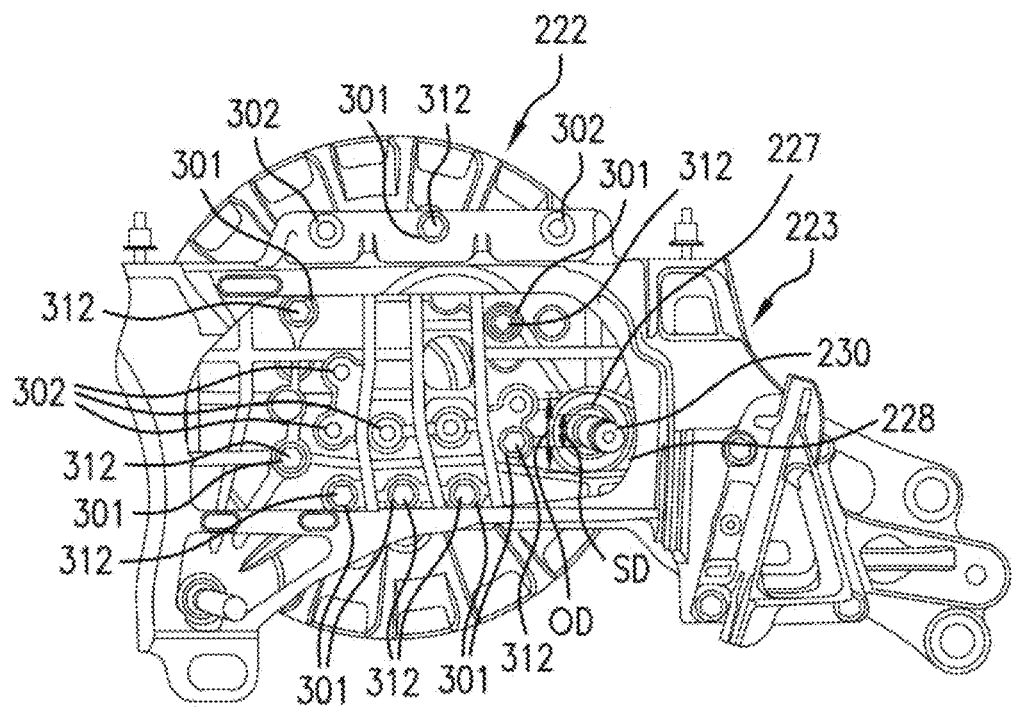
FIG. 4A illustrates a side view of a first wheel mounted to the mounting system of FIGS. 2-3.
Figure 5A:
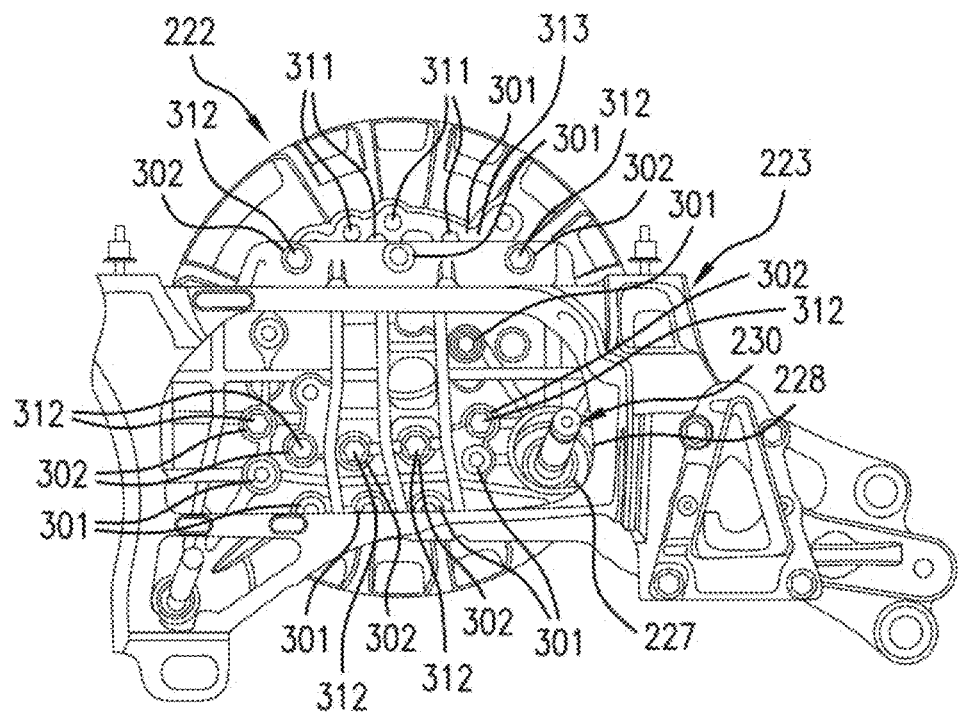
FIG. 5A illustrates a side view of a second wheel mounted to the mounting system of FIGS. 2-3, the second wheel having a greater wheel diameter than the first wheel of FIGS. 4A-4B.
Figure 4B:
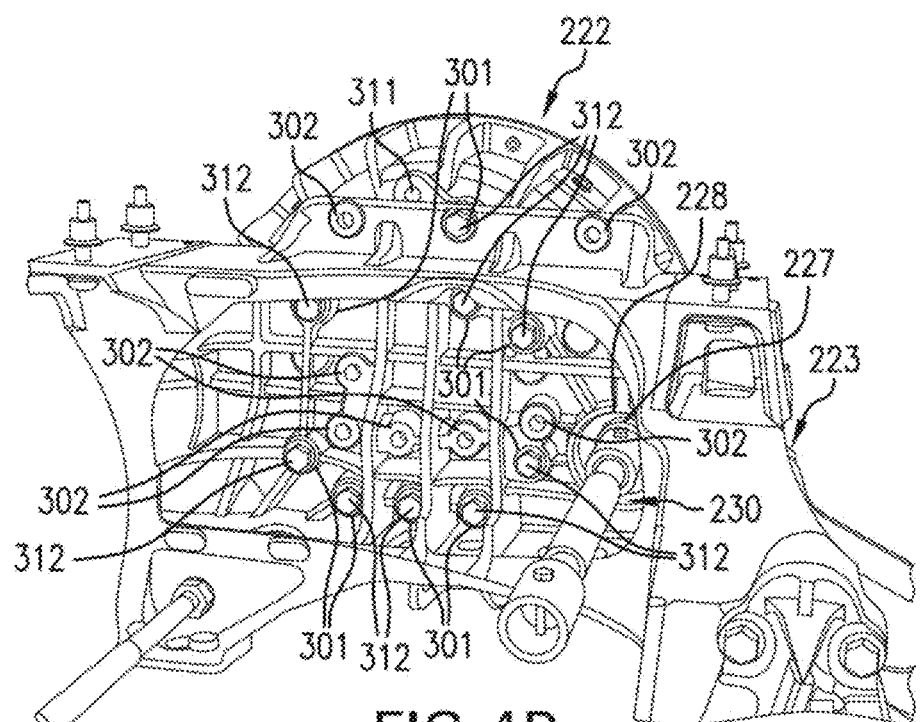
FIG. 4B illustrates a perspective view of the first wheel of FIG. 4A mounted to the mounting system.
Figure 5B:
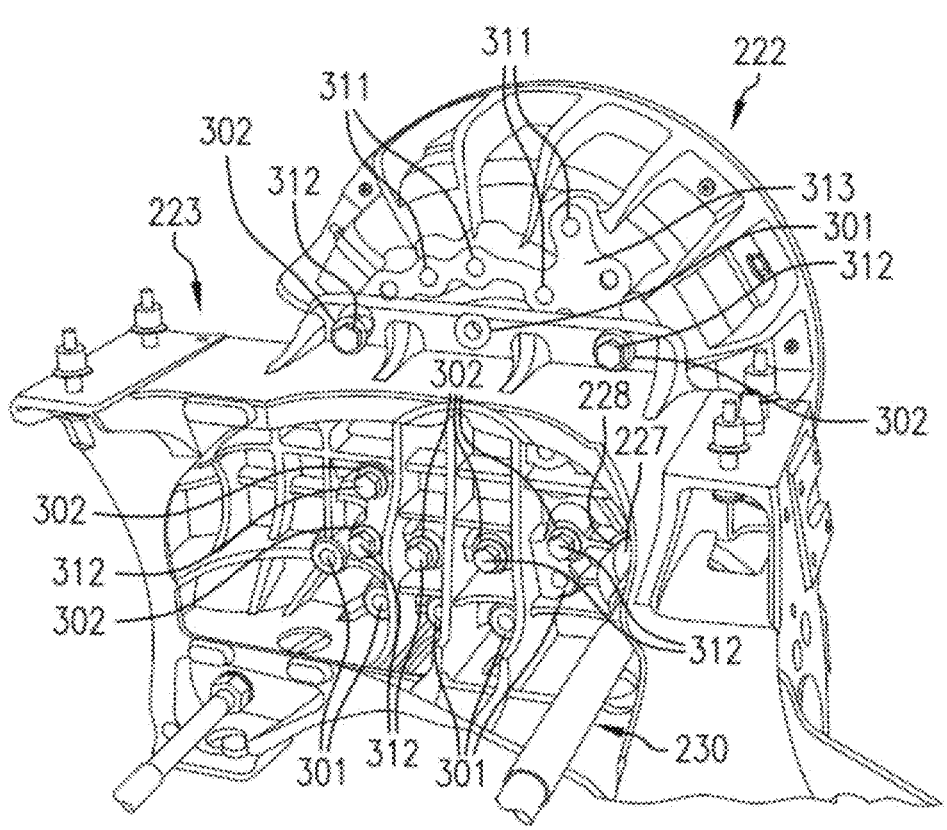
FIG. 5B illustrates a perspective view of the second wheel of FIG. 5A mounted to the mounting system.
Figure 6:
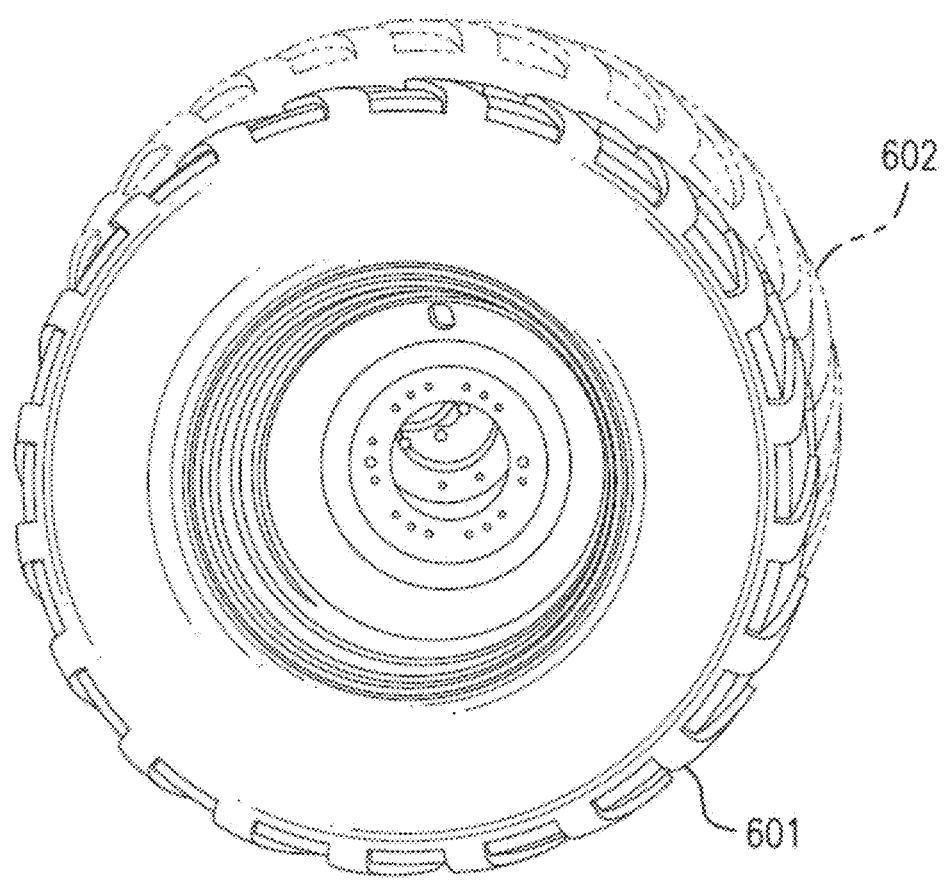
FIG. 6 illustrates a side view of the work vehicle of FIG. 1 when the first wheel or the second wheel are mounted to the mounting system, with the work vehicle being at a same level regardless of which wheel is mounted.

To address some of the foregoing issues, and referring now to FIGS. 2-6, the work vehicle 100 includes a driveline 210 including a mounting system 220 that is used to mount the wheels 102. The mounting system 220 includes an axle 221, a final drive 222 that is coupled to the axle 221 and configured to rotate a wheel mounted to the final drive 222, such as the wheel 102, and a pivot plate 223 coupling the final drive 222 to the axle 221. The axle 221 may be, for example, a front axle and the final drive 222 may be driven by an input shaft 230. Referring specifically to FIG. 3, it is illustrated that the pivot plate 223 includes a first arrangement of plate mounting features 301 and a second arrangement of plate mounting features 302 that differs from the first arrangement of plate mounting features 301. It should be appreciated that while only two arrangements of plate mounting features 301, 302 are described, more than two arrangements of plate mounting features 301, 302 may be provided according to the present disclosure if, for example, the mounting system 220 will be used to mount more than two different types of wheels. The final drive 222 includes at least one set of drive mounting features 311 and is rotatable from a first orientation, illustrated in FIGS. 4A and 4B, where the set(s) of drive mounting features 311 is aligned with the first arrangement of plate mounting features 301 to a second orientation, illustrated in FIGS. 5A-5B, where the set(s) of drive mounting features 311 is aligned with the second arrangement of plate mounting features 302. In some embodiments, a single set of drive mounting features 311 is provided that align with the first and second arrangement of plate mounting features 301, 302. In some embodiments, multiple sets of drive mounting features are provided that each align with a respective arrangement of plate mounting features 301, 302.

Regardless of which orientation the final drive 222 is in, the aligned set(s) of drive mounting features 311 can be coupled to the first or second arrangement of plate mounting features 301, 302 in order to mount differently sized wheels to the final drive 222. When the final drive 222 is in the first orientation, for example, the drive mounting features 311 can be coupled to the first arrangement of plate mounting features 301 so a first wheel 601 (illustrated in FIG. 6) with a first diameter may be coupled to the final drive 222. When the final drive 222 is in the second orientation with the drive mounting features 311 coupled to the second arrangement of plate mounting features 302, on the other hand, a second wheel 602 (also illustrated in FIG. 6) with a second diameter that differs from the first diameter may be coupled to the final drive 222. The second diameter of the second wheel 602 may, for example, be greater than the first diameter of the first wheel 601, i.e., the second wheel 602 is a larger wheel than the first wheel 601. The first diameter may be, for example, around 2000 mm, such as 1950 to 2050 mm, while the second diameter may be, for example, around 2300 mm, such as 2200 to 2300 mm. In this respect, the different arrangements of plate mounting features 301, 302 allow the final drive 222 to be rotated and coupled to the pivot plate 223 in different orientations in order to mount different sized wheels 601, 602 to the mounting system 220. The arrangements of plate mounting features 301, 302 and the set(s) of drive mounting features 311 may be chosen so that a vertical level of the work vehicle 100 is the same when the first wheel 601 is mounted to the final drive 222 and when the second wheel 602 is mounted to the final drive 222, as can be appreciated from FIG. 6. For example, some (or all) of the first arrangement of plate mounting features 301 may be lower than the second arrangement of plate mounting features 302 to account for the first wheel 601 being smaller than the second wheel 602.

The mounting features 301, 302, 311 can be provided in a variety of configurations. In some embodiments, some or all of the mounting features 301, 302, 311 comprise a plurality of mounting openings 301, 302, 311. As illustrated, all of the mounting features 301, 302, 311 comprise mounting openings that can be coupled together using respective couplers 312, which may be dowels, bolts, screws, etc. The mounting features 311 of the final drive 222 may be formed, for example, in a mounting plate 313 mounted to the final drive 222 on a side of the final drive 222 facing away from the wheel 601, 602. It should be appreciated, however, that the mounting features 301, 302, 311 do not all need to be openings and, in some embodiments, none of the mounting features 301, 302, 311 are openings. For example, the plate mounting features 301, 302 may be openings whereas the drive mounting features may be protrusions, such as pegs, that at least partially fit within the plate mounting features (openings) 301, 302. By forming the drive mounting features as protrusions that at least partially fit within openings 301, 302 formed in the pivot plate 223, it is easy for a user to know when the final drive 222 has been rotated to the first orientation or the second orientation based on which set of plate mounting features 301, 302 are holding the drive mounting features (protrusions) of the final drive 222. While the previous alternative describes the drive mounting features as being protrusions and the plate mounting features 301, 302 as openings, it should be appreciated that the plate mounting features can also be formed as protrusions with the drive mounting features being formed as either corresponding openings or protrusions. It should thus be appreciated that the mounting features 301, 302, 311 can be formed in a variety of ways to couple the final drive 222 to the pivot plate 223 in the first orientation and the second orientation.

Referring specifically to FIG. 2, it is illustrated that the mounting system 220 may further include an actuator 224 that is coupled to the axle 221. The actuator 224 may be, for example, a hydraulic or pneumatic cylinder or an electric actuator with an actuator rod 225 that is coupled to a middle section 229 of the axle 221. The actuator 224 is configured to adjust a height of the axle 221. For example, the actuator 224 may be mounted in the work vehicle 100 so the actuator rod 225 is generally vertical with respect to the ground. In such a configuration, extension and retraction of the actuator rod 225 causes a corresponding movement of the axle 221 in the vertical direction (indicated by the arrow designated as V). Since the final drive 222 and pivot plate 223 are coupled to the axle 221, vertical movement of the axle 221 by the actuator 224 also causes a corresponding vertical movement of the final drive 222 and the pivot plate 223. Such vertical movement may be desired, for example, when mounting a differently sized wheel 601, 602 to the final drive 222. When mounting the larger second wheel 602, for example, the actuator 224 may retract the actuator rod 225 away from the ground so the overall vertical level of the work vehicle 100 does not change when the second wheel 602 is mounted rather than the first wheel 601. In some embodiments, the actuator 224 may be coupled to a controller 226 that is configured to output adjustment signals to the actuator 224 so the work vehicle 100 remains at the same vertical level regardless of what wheel is mounted to the final drive 222. The controller 226 may be configured, for example, to receive a wheel size signal, which may be manually input by a user or detected automatically, and responsively output an actuator adjustment signal to the actuator 224 so the actuator 224 makes the required adjustment to keep the work vehicle 100 at the same level. It should be appreciated that the actuator 224 may be provided to adjust the height of the axle 221 independently of rotating the final drive 222, so in some embodiments the final drive 222 is provided without needing to rotate in order to mount differently sized wheels. Using the actuator 224 to maintain the vertical level of the work vehicle 100 can keep the wheel base and oil level of the work vehicle 100 and its parts the same, reducing the need for other adjustments. It should, however, be appreciated that the actuator 224 can be used to adjust the height of the axle 221 in combination with a user rotating the final drive 222 to mount different wheels 601, 602, i.e., the features can be independently provided or can be combined together.

As previously described, the final drive 222 is configured to rotate a mounted wheel, such as either of the wheels 601, 602. The final drive 222 can be configured to generate or transfer rotational power in a variety of ways. In some embodiments, the final drive 222 is configured to couple to an input shaft 230 of the driveline 210 that is configured to drive the final drive 222 and rotate a wheel 601, 602 mounted thereto. The input shaft 230 may be coupled, for example, to a motor or component of a transmission, such as a differential or gearbox, to transfer rotational power to the final drive 222, which drives the final drive 222 to rotate the mounted wheel. The final drive 222 may include one or more shaft couplers 227 that couple to the input shaft 230.

As best illustrated in FIGS. 3-5B, the pivot plate 223 may include a shaft opening 228 that is sized to allow the input shaft 230 to extend therethrough and couple to the final drive 222 when the final drive 222 is in the first orientation and the second orientation. In other words, the shaft opening 228 may be sized and shaped to allow the final drive 222 to couple to the input shaft 230 regardless of the orientation of the final drive 222. The shaft opening 228 may define an opening diameter OD that is greater than a shaft diameter SD of the input shaft 230, such as at least two times or at least three times greater. As can be appreciated from FIGS. 4A-5B, the final drive 222 may rotate about the input shaft 230, i.e., about an axis defined by the input shaft 230, so the shaft opening 228 having an opening diameter OD that is considerably greater than the shaft diameter SD can provide sufficient clearance for the final drive 222 to rotate about the input shaft 230 and still be connectable to the input shaft 230 regardless of the orientation of the final drive 222. The input shaft 230 may be in a set position where the input shaft 230 generally does not move vertically but can still couple with the final drive 222 in both the first orientation and the second orientation. In this respect, while the axle 221 may be movable by the actuator 224, the input shaft 230 may be isolated from the actuator 224, e.g., disconnected from the actuator rod 225, so the actuator 224 is configured to adjust the height of the axle 221 without adjusting the height of the input shaft 230.

Figure 7:
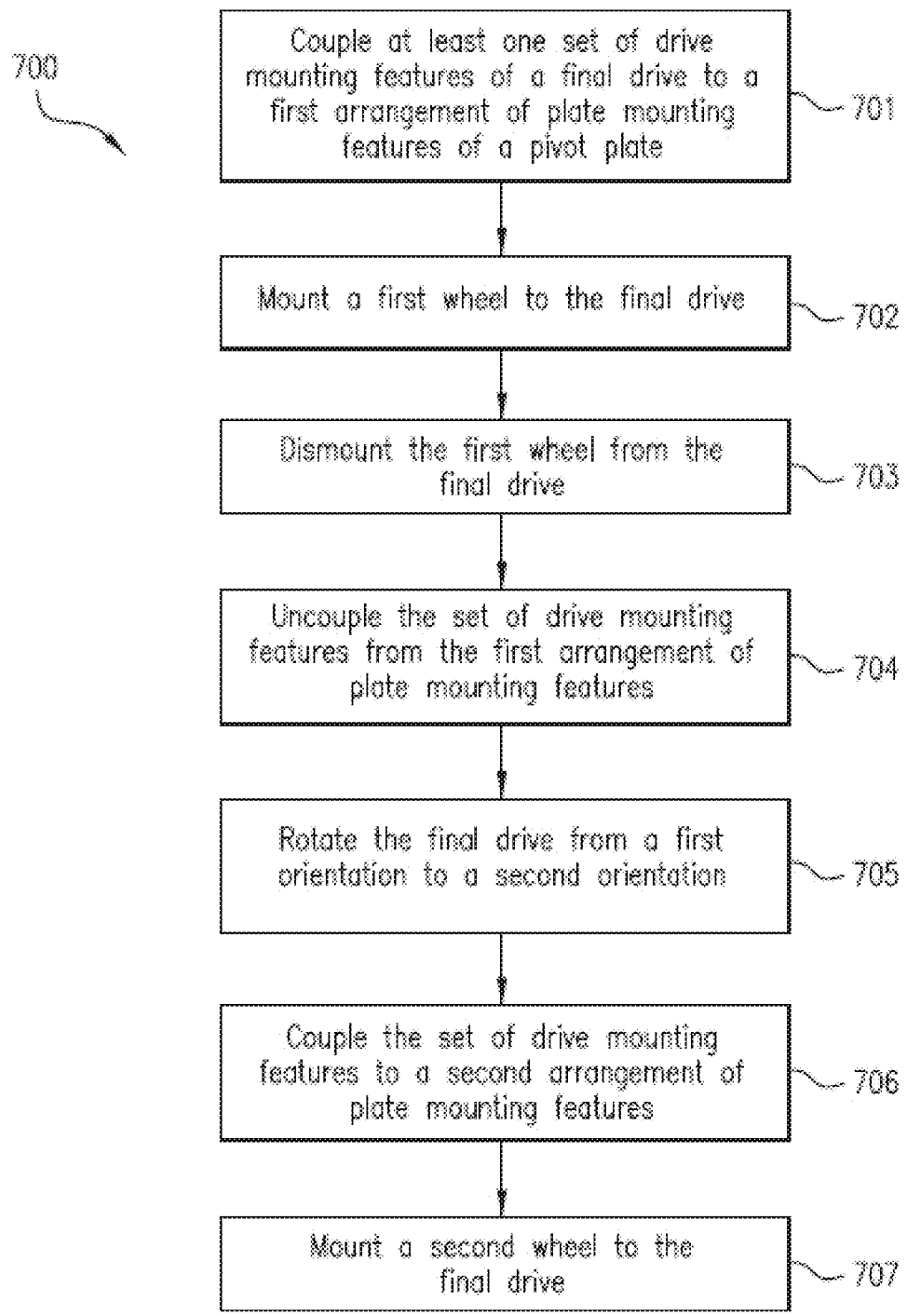
FIG. 7 is a flow chart illustrating an exemplary embodiment of a method for mounting wheels to the driveline and/or work vehicle of FIGS. 1 and 6.

Referring now to FIG. 7, an exemplary embodiment of a method 700 of mounting wheels, such as the wheels 601 and 602, to the driveline 210 and/or to the work vehicle 100 is illustrated. The method 700 includes coupling 701 at least one set of drive mounting features 311 to the first arrangement of plate mounting features 301 while the final drive 222 is in the first orientation; mounting 702 the first wheel 601 to the final drive 222, the first wheel 601 defining a first diameter; dismounting 703 the first wheel 601 from the final drive 222; uncoupling 704 the set of drive mounting features 711 from the first arrangement of plate mounting features 701; rotating 705 the final drive 222 to the second orientation; coupling 706 the drive mounting features 711 to the second arrangement of plate mounting features 702 while the final drive 222 is in the second orientation; and mounting 707 the second wheel 602 to the final drive 222, the second wheel 602 defining a second diameter that differs from the first diameter. It should be appreciated that while the wheels 601, 602 are described as being mounted 702, 707 to the final drive 222 after the drive mounting features 711 are coupled 701, 706 to the respective plate mounting features 301, 302, the wheels 601, 602 can also be mounted 702, 707 to the final drive 222 prior to coupling 701, 706 to the respective plate mounting features 301, 302 and/or prior to rotating 705 the final drive 222. A vertical level of the work vehicle 100 may be the same when the first wheel 601 is mounted 702 to the final drive 222 and when the second wheel 602 is mounted 707 to the final drive 222, i.e., the vertical level (height) does not change regardless of which wheel 601, 602 is mounted 702, 707. The vertical level may be maintained due to the configuration of the mounting features 301, 302, 311 and/or due to adjustment by the actuator 224, as previously described.

From the foregoing, it should be appreciated that the mounting system 220 of the driveline 210 provided according to the present disclosure allows a variety of different wheels to be mounted without requiring any additional parts, which is convenient for the user. Further, the wheels can be changed in a fairly expeditious and intuitive manner, which reduces downtime of the work vehicle 100 to change the wheels. Even further, the vertical level/height of the work vehicle 100 can be the same regardless of the wheel size of the wheel that is mounted to the final drive 222, which can reduce the need for adjusting other parameters of the work vehicle 100. It should thus be appreciated that the mounting system 220 provided according to the present disclosure provides an improved way to mount different wheels compared to those known in the prior art.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A mounting system for a work vehicle, said mounting system comprising:
   an axle;
   a final drive coupled to the axle and configured to rotate a wheel mounted to the final drive; and
   a pivot plate coupling the final drive to the axle, wherein the pivot plate comprises a first arrangement of plate mounting features and a second arrangement of plate mounting features that differs from the first arrangement of plate mounting features,
   the final drive comprising at least one set of drive mounting features and being rotatable from a first orientation where the at least one set of drive mounting features is aligned with the first arrangement of plate mounting features to a second orientation where the at least one set of drive mounting features is aligned with the second arrangement of plate mounting features.

2. The mounting system of claim 1, wherein the first arrangement of plate mounting features and/or the second arrangement of plate mounting features and/or the at least one set of drive mounting features comprises a plurality of mounting openings.

3. The mounting system of claim 2, wherein at least the first arrangement of plate mounting features and the second arrangement of plate mounting features each comprise a plurality of mounting openings.

4. The mounting system of claim 2, wherein all of the first arrangement of plate mounting features, the second arrangement of plate mounting features, and the at least one set of drive mounting features each comprise a plurality of mounting openings.

5. The mounting system of claim 1, further comprising an actuator coupled to the axle and configured to adjust a height of the axle.

6. The mounting system of claim 1, wherein the pivot plate comprises a shaft opening that is sized to allow an input shaft to extend therethrough and couple to the final drive when the final drive is in the first orientation and the second orientation.

7. A driveline for a work vehicle, comprising:
   the mounting system of claim 1; and
   an input shaft coupled to the final drive and configured to drive the final drive and rotate the wheel mounted thereto.

8. The driveline of claim 7, wherein the input shaft is configured to couple with the final drive in both the first orientation and the second orientation while the input shaft is in a set position.

9. The driveline of claim 8, wherein the shaft opening defines an opening diameter (OD) that is greater than a shaft diameter (SD) of the input shaft.

10. The driveline of claim 9, wherein the opening diameter (OD) is at least two times greater than the shaft diameter (SD) of the input shaft.

11. The driveline of claim 9, wherein the opening diameter (OD) is at least three times greater than the shaft diameter (SD) of the input shaft.

12. The driveline of claim 7, wherein the input shaft extends through a shaft opening formed in the pivot plate.

13. The driveline of claim 7, wherein the final drive is configured to rotate about the input shaft from the first orientation to the second orientation.

14. The driveline of claim 7, further comprising an actuator coupled to the axle and configured to adjust a height of the axle.

15. The driveline of claim 14, wherein the actuator is configured to adjust the height of the axle without adjusting a height of the input shaft.

16. A work vehicle, comprising:
a chassis;
the driveline of claim 7 carried by the chassis; and
the wheel mounted to the final drive of the driveline.

17. The work vehicle of claim 16, wherein the wheel defines a first diameter when the final drive is in the first orientation or defines a second diameter that differs from the first diameter when the final drive is in the second orientation.

18. A method for successively mounting a first wheel and a second wheel to a work vehicle, said work vehicle comprising an axle, a final drive coupled to the axle and configured to rotate either the first wheel or the second wheel that is mounted to the final drive, and a pivot plate coupling the final drive to the axle, wherein the final drive comprises at least one set of drive mounting features, and wherein the pivot plate comprises a first arrangement of plate mounting features and a second arrangement of plate mounting features that differs from the first arrangement of plate mounting features, said method comprising:

coupling the at least one set of drive mounting features to the first arrangement of plate mounting features while the final drive is in a first orientation;

mounting the first wheel to the final drive, the first wheel defining a first diameter;

dismounting the first wheel from the final drive;

uncoupling the at least one set of drive mounting features from the first arrangement of plate mounting features;

rotating the final drive to a second orientation that differs from the first orientation;

coupling the at least one set of drive mounting features to the second arrangement of plate mounting features while the final drive is in the second orientation; and mounting the second wheel to the final drive, the second wheel defining a second diameter that differs from the first diameter.

19. The method of claim 18, wherein a vertical level of the work vehicle when the first wheel is mounted to the final drive is the same as the vertical level of the work vehicle when the second wheel is mounted to the final drive.

* * * * *